United States Patent
Pickel et al.

[11] Patent Number: 5,811,141
[45] Date of Patent: Sep. 22, 1998

[54] MOLD-CLOSING APPARATUS FOR AN INJECTION-MOLDING MACHINE

[75] Inventors: Herbert Pickel, Planegg; Walter Wohlrab, Weissenburg, both of Germany

[73] Assignee: Krauss-Maffei AG, Munich, Germany

[21] Appl. No.: 702,679

[22] PCT Filed: Dec. 16, 1995

[86] PCT No.: PCT/EP95/04989

§ 371 Date: Aug. 19, 1996

§ 102(e) Date: Aug. 19, 1996

[87] PCT Pub. No.: WO96/19331

PCT Pub. Date: Jun. 27, 1996

[30] Foreign Application Priority Data

Dec. 20, 1994 [DE] Germany .......................... 44 45 448.1
Dec. 20, 1994 [DE] Germany .......................... 44 45 450.3
Oct. 4, 1995 [DE] Germany ........................ 29 51 5748.8

[51] Int. Cl.$^6$ .................................................. B29C 45/64
[52] U.S. Cl. .................... 425/589; 100/231; 100/258 A; 425/450.1; 425/451.9
[58] Field of Search ................................ 425/451.2, 589, 425/450.1, 452.9, 590, 595; 100/231, 258 A

[56] References Cited

U.S. PATENT DOCUMENTS

| | | | |
|---|---|---|---|
| 4,460,326 | 7/1984 | Croseck | 425/411 |
| 4,861,259 | 8/1989 | Takada | 425/451.2 |
| 5,135,385 | 8/1992 | Fukuzawa et al. | 425/595 |
| 5,249,951 | 10/1993 | Leonhartsberger et al. | 425/589 |
| 5,536,166 | 7/1996 | Schad | 425/589 |
| 5,578,329 | 11/1996 | Hohl | 425/192 R |

FOREIGN PATENT DOCUMENTS

| | | |
|---|---|---|
| 0 554 068 A1 | 8/1993 | European Pat. Off. . |
| 0 620 095 A3 | 10/1994 | European Pat. Off. . |
| 20 20 247 B2 | 11/1971 | Germany . |
| 2 162 630 | 6/1973 | Germany . |
| 92 12 480.1 | 1/1993 | Germany . |
| 43 02 639 A1 | 9/1993 | Germany . |

*Primary Examiner*—Patrick Ryan
*Assistant Examiner*—Ivrie A. Schwartz
*Attorney, Agent, or Firm*—Herbert Dubno

[57] ABSTRACT

An injection molding machine has a pair of C-shaped tension members interconnecting the fixed bracing plates at location above the axis of force action in the mold closing and injection operations. The mold closing unit is mounted on one of these plates and a mold part on the other plate while the mold closing unit acts on the movable mold part. According to the invention, the fixed plates are also interconnected by lower tension members which can be C-shaped or can be tension rods so that access to the space between the mold parts remains available, the upper and lower tension members being matched as to elongation under the generation of the mold closing and injection forces.

6 Claims, 5 Drawing Sheets

MOLD-CLOSING APPARATUS FOR AN INJECTION-MOLDING MACHINE

CROSS REFERENCE TO RELATED APPLICATIONS

This application is the U.S. national phase of PCT application PCT/EP95/04989 filed 16 Dec. 1995 with a claim to the priorities of German patent applications P 44 45 448.1 filed 20 Dec. 1994, P 44 45 450.3 filed 20 Dec. 1994, and 295 15 748.8 filed 4 Oct. 1995.

FIELD OF THE INVENTION

The invention relates to a mold-closing apparatus for a plastic-molding machine of the type having a machine frame, two fixed plates which are supported on the frame and spaced apart parallel to each other, at least one movable mold-holding plate which is movable between the fixed plates on the frame, at least one closing drive which is mounted on one of the fixed plates and which can act on the movable mold-holding plate with a closing force effective along a force axis toward the other fixed plate, and a plurality of tension members which connect the two fixed plates with each other and which withstand the reaction forces created by the closing drive on the two fixed plates. In this arrangement the tension members normally include two upper tension members whose attachment points lie on the fixed plates above a horizontal plane including the force axis and two lower tension members whose attachments points-on the fixed plates lie below this horizontal plane.

The invention is preferable usable in an injection-molding machine whereby in this case only one movable mold-holding plate is provided and one of the two mold-holding plates is constituted as a stationary mold-holding plate. The other fixed plate is the support plate of the closing drive. The invention is however movable mold-holding plates which are movable toward each other by two drive units. Both fixed plates are then support plates of the two closing drives. This type is particularly applicable to blow-molding machines.

The force applied by the closing drive to close the mold is effective on the two fixed plates against a reaction force driving them apart it being understood that plastic injected into the closed mold must be withstood by the fixed plates as a force driving the mold halves apart. The two fixed plates must therefore be connected together by adequately dimensioned tension elements which prevent outward movement of the stationary plates and an opening of the mold by the injection pressure.

In injection-molding machines of standard construction the tension members are formed as four straight rods or columns which interconnect the two fixed plates, i.e. as a rule the stationary mold-holding plate and the support plate carrying the closing cylinder and are secured in the corner regions of these plates. In this manner one has sufficient mutual support of the fixed plates with uniform distribution of force over the surfaces of these plates that can prevent opening of the mold by the injection pressure even when as a result of the formation of the injection mold the injection pressure is effective asymmetrically to the central axis of the mold. The use of straight rods or columns as tension members has however the disadvantage that in particular the two rods remote from the frame impede free access to the space between the stationary plates. This is particularly inconvenient for use with a manually loaded device since access must be had to the space between the open mold parts in order to remove the finished molded article.

The above-used term "fixed plate" means that in use the plates are substantially stationary and do not participate in the opening and closing movements of the mold tools. As a rule however at least one of these stationary plates and sometimes even both are limitedly shiftable on the machine frame so that they can be shifted longitudinally of the machine by the closing force to compensate for length changes of the tension members.

In order to avoid impeding access to the space between the mold halves so-called rodless injection-molding machines have been proposed. These have instead of the straight rods or columns on each side of the machine a C-shaped tension member which interconnects the two fixed plates and extends in the region between the fixed plates above the upper edge of the machine frame so as to leave accessible the space between the fixed plates. Such a rodless injection molding machine is known for example from European 0,554,068. The use of the same principle with C-shaped tension elements in a plastic molding machine with two relatively movable mold-holding plates, in particular a blow-molding machine, is known from U.S. Pat. No. 3,797,165. It is further known from German 4,411,649 to assemble such C-shaped tension members from several parts, e.g. from two L-shaped parts. This does not however change that. The L-shaped parts together form a C-shaped member that is connected only at two points with the fixed plates.

It is further known to do completely away with the use of particular tension elements and to support the two fixed plates directly on the corresponding C-shaped machine frame as for example shown in German utility model 9,212,480.

The transmission of the closing reaction force via a C-shaped tension member or a C-shaped machine frame results in the unavoidable deformation of the C-member with a spreading of the C-legs, that is with a change in angular orientation of the C-legs. So that this does not lead to a correspond angular change between the fixed plates, that is to a loss of parallelism of the fixed plates, all of the known constructions are set up such that the two stationary plates are rockable at their centers about a horizontal axis on the C-shaped tension members or on the machine frame. Thus the two fixed plates are free to remain parallel regardless of the deformations of the C-shaped tension members or of the machine frame. As a result of their free rocking about the horizontal axis the two fixed plates and the mold parts mounted on them can be tipped about a horizontal axis by the forces which are effective eccentric to the central axis of the mold parts so that the space between the mold parts opens on one side which leads to a leakage of the molten plastic into the space and to flash formation on the molded piece. In the known constructions the advantage of unimpeded access to the space between the fixed plates is traded off against the disadvantage that the apparatus is liable to one-sided opening of the mold.

OBJECT OF THE INVENTION

It is therefore an object of the invention to provide an apparatus of the known type wherein the space between the fixed plates is freely accessible unhindered by straight guide rods but the fixed plates are maintained at all times in their parallel orientation.

SUMMARY OF THE INVENTION

The invention can comprise:

a machine frame, two fixed plates which are supported on the frame and spaced apart parallel to each other, at least one movable mold-holding plate which is movable between the fixed plates on the frame, at least one closing drive which is mounted on one of the fixed plates and which can act on the movable mold-holding plate with a closing force effective along a force axis toward the other fixed plate, and a plurality of tension members which connect the two fixed plates with each other and which withstand the reaction forces created by the closing drive on the two fixed plates.

According to the invention the tension members including two upper tension members whose attachment points lie on the fixed plates above a horizontal plane including the force axis and two lower tension members whose attachment points on the fixed plates lie below this horizontal plane.

The upper tension members are C-shaped such that at least in the region between the mold-holding plate and the other fixed plate their upper edges lie below the horizontal plane including the closing-force axis so as to leave substantially unimpeded access to the space between the mold-holding plate and the fixed plate. The lower tension members are so constructed and dimensioned that their resistance to deformation in the direction of the closing force is equal to that of the upper tension members so that with a given closing force the elongation of the lower tension members is equal to the elongation of the upper tension members. In this solution, as a result of careful selection of the shapes and dimensions of the lower tension members, these have the same elongation as the upper tension members when stressed by the closing force so that exact parallelism of the fixed plates is ensured. This is most simply achieved according to claim when all the tension members are C-shaped having the same shape and dimensions.

The invention can comprise:

a machine frame, two fixed plates which are supported on the frame and spaced apart parallel to each other, at least one movable mold-holding plate which is movable between the fixed plates on the frame, at least one closing drive which is mounted on one of the fixed plates and which can act on the movable mold-holding plate with a closing force effective along a force axis toward the other fixed plate, and a plurality of tension members which connect the two fixed plates with each other and which withstand the reaction forces created by the closing drive on the two fixed plates.

According to the invention the tension members include two upper tension members whose attachment points lie on the fixed plates above a horizontal plane including the force axis and two lower tension members whose attachment points on the fixed plates lie below this horizontal plane and the upper tension members are C-shaped such that at least in the region between the mold-holding plate and the other fixed plate their upper edges lie below the horizontal plane including the closing-force axis so as to leave substantially unimpeded access to the space between the mold-holding plate and the fixed plate.

Each upper tension member or each lower tension member can be connected with at least one of the fixed plates via a resiliently deformable force-transmitting element whose resistance to deformation relative to the closing force is such that it compensates for the difference between the resistance to deformation between the upper tension members and the lower tension members. With this solution lower and upper tension members are used which as a result of different shapes have different resistances to deformation when stressed by the closing force. By inserting resiliently deformable force-transmitting members between the tension members and at least one of the fixed plates each of the different resistances to deformation of the tension members can be compensated for and an exact parallelism of the fixed plates is ensured.

Both solutions according to the invention have, relative to conventional apparatus where the fixed plates are interconnected by four straight tie rods, the advantage that they do not impede access to the space between the fixed plates and in particular access to the space between the opened injection-molding mold halves. Relative to the above-described rodless machines, where only one C-shaped tension member is provided on each side of the machine, both solutions according to the invention have the advantage that the fixed plates are connected above and below the closing axis by tension members and thus are held parallel by the tension members.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
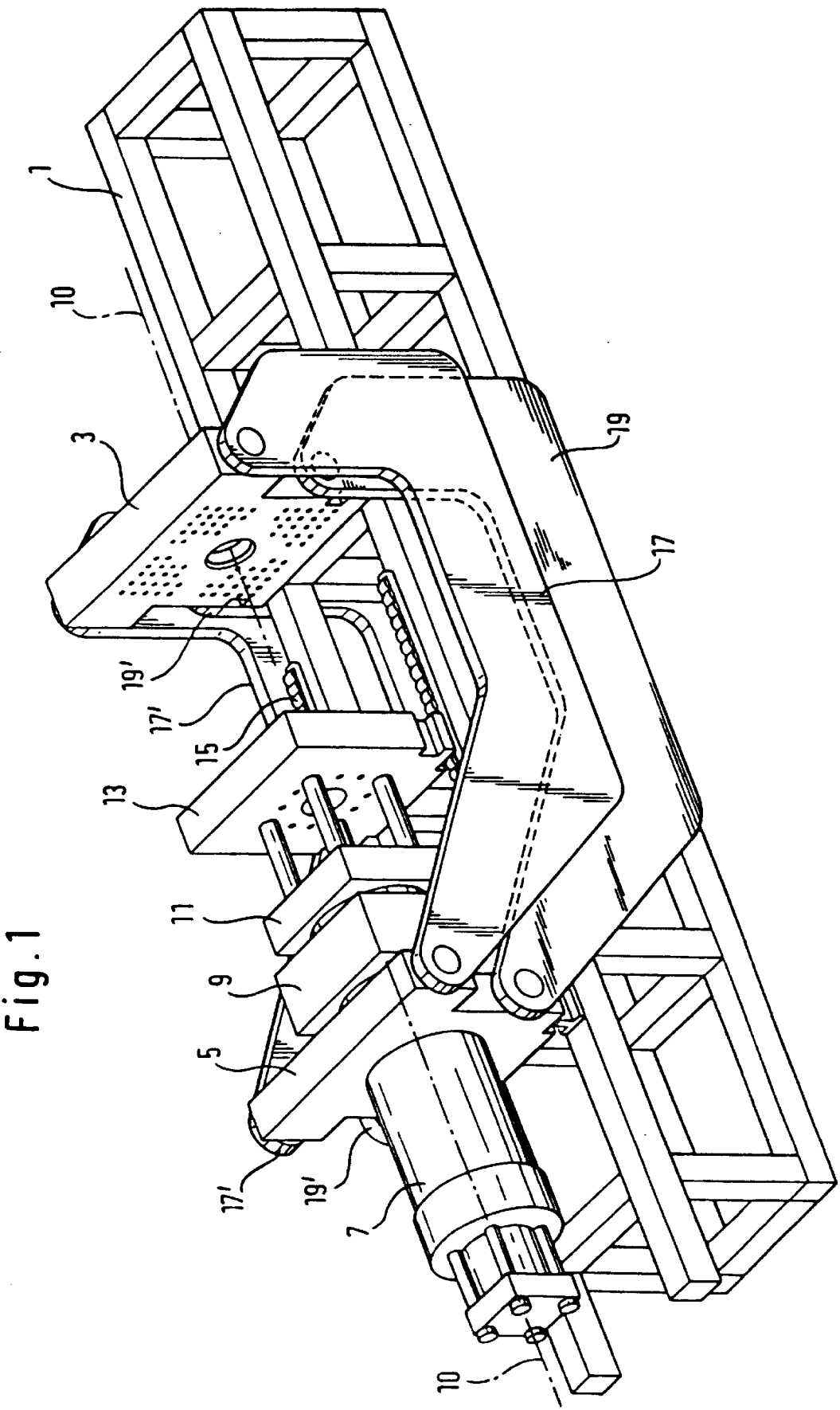
FIG. 1 is a schematic perspective view of a mold-closing apparatus for an injection-molding machine according to a first embodiment of the first solution according to the invention.

The apparatus according to FIG. 1 has a machine frame 1. It carries two fixed plates 3 and 5 that are spaced but parallel to each other. One of the fixed plates 3 is formed as a stationary mold-holding plate and is fixed on the machine frame 1. The other fixed plate 5 is a support plate on which a hydraulic closing cylinder 7 is secured which passes through the fixed plate 5 and whose piston can exert a closing force along a closing-force axis 10 and via two intermediate pressure plates 9 and 11 on a movable mold-holding plate 13 which is longitudinally movable on the machine frame 1 for example on roller tracks 15. Pressurizing the closing cylinder 7 with a hydraulic medium can move the movable mold-holding plate 13 toward the fixed mold-holding plate 3 so that the (unillustrated) mold parts carried by the plates 3 and 13 are closed and acted on by a holding force. The fixed plate constituting a support plate is preferably in turn supported by means of a roller bearing (not shown) so that it can shift slightly longitudinally.

In order to brace the fixed plates 3 and 5 against the reaction forces driving them apart, the fixed plates 3 and 5 are connected together by four tension members 17, 19, 17' and 19' which are arranged in pairs on the sides of the apparatus. The tension members 17, 17', 19, and 19' are mounted via pivots to the corners of the respective fixed plates 3 and 5, the tension members 17 engaging the corners remote from the fixed plates 3 and 5 and the tension members 19 and 19' on the ends closer to the frame.

Each tension member 17, 17', 19, and 19' is generally C-shaped. As a result of the C-shape of the tension elements 17 and 17' remote from the frame, their upper edges are lower in a central region than the closing-force axis 10 and preferably below the lower edge of the (unillustrated) mold parts carried by the mold-holding plates 3 and 13. In this manner free access is ensured to the space between the stationary mold-holding plate 3 and the movable mold-holding plate 13. Even the tension elements 19 and 19' closer to the frame have the exact same C-shape and are otherwise dimensioned identically to the upper tension members 17 and 17' even though this is not needed for free access to the space between the plates 3 and 13. This ensures that when the tension members 17, 17', 19, and 19' are tensioned by the reaction forces of the closing force exerted by the closing device 7 all the tension members 17, 17', 19, and 19' deform to the exact same extent longitudinally of the machine. Thus independent of the extent of this deformation the fixed plates 3 and 5 are always maintained exactly parallel to each other. In practice the tension members are dimensioned such that their longitudinal deformation at maximum closing force is less than 0.1% so that with a tension member about 2 m long one must allow for a longitudinal deformation in the neighborhood of for example about 1 mm.

Instead of the pivotal mounting of the tension members 17, 17', 19, and 19' on the stationary plates 3 and 5 shown in FIG. 1 all these connections or some of them can also be rigid since the deformations of the C-shaped tension members only lead to extremely small twisting of the C-legs relative to the parallel fixed plates 3 and 5.

While in the embodiment according to FIG. 1 the identical deformation of the tension members is achieved by identical construction of the tension members it is also possible with different shapes of tension members to achieve an identical elongation of the corresponding dimensions. As a result the tension members can also be differently constructed.

Figure 2:
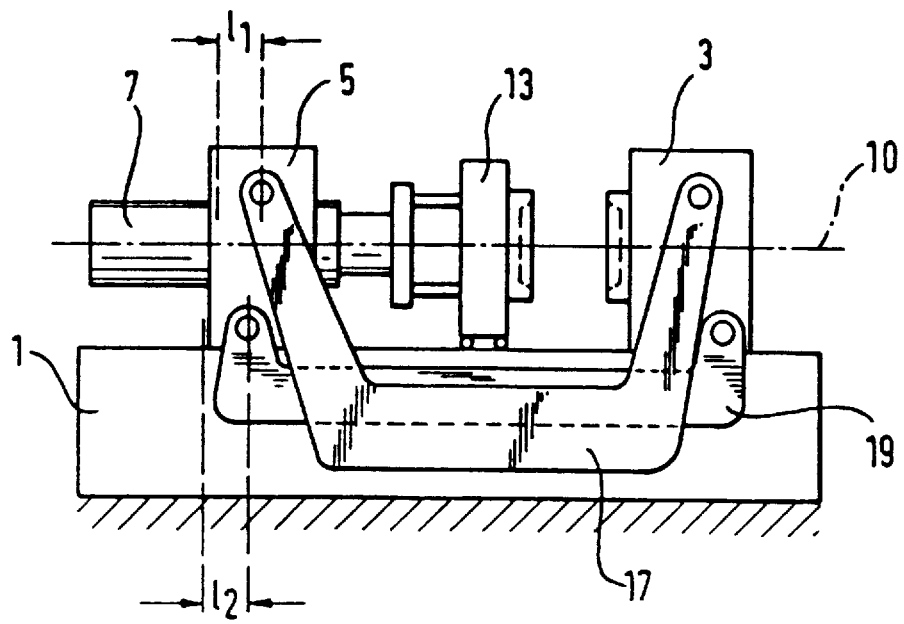
FIG. 2 is a second embodiment of the invention in a schematic side view.

In the embodiment of FIG. 2 the tension members 19 connected to the corners of the stationary plates 5 and 3 closer to the frame have a substantially flatter C-shape than the tension members 17 on the corners away from the frame. Since the latter as a result of the greater lengths of their C-legs will deform more, the tension members 19 nearer the frame are so formed with respect to their dimensions and materials, e.g. by use of thinner plate, that in spite of the shorter C-legs they have the same elongation characteristic so that when the closing force is applied the change in length $L_1$ of the upper tension member 17 is equal to the change in length $L_2$ of the lower tension member 19.

Figure 3:
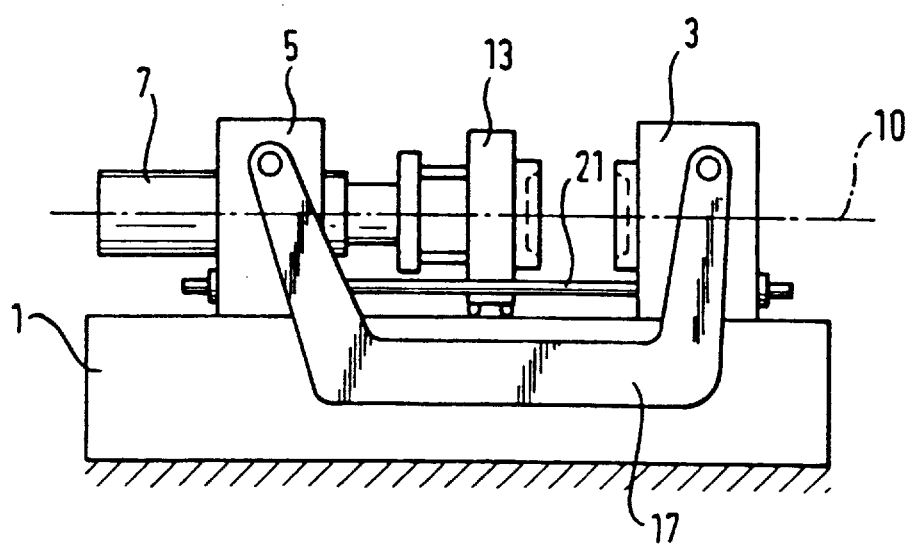
FIG. 3 is a third embodiment of the invention in a schematic side view.

In the embodiment according to FIG. 3 only the tension members 17 on the corners away from the frame are C-shaped while the corners of the fixed plates 3 and 5 lying closer to the frame are interconnected in the conventional manner by straight tie rods 21. Since these are very close to the machine frame 1 they do not substantially limit access to the space between the fixed plate 3 and the movable plate 13. Even here one must be careful to provide a particularly stiff construction of the C-shaped tension members 17 and a correspondingly soft construction of the tie rods 21 so that their elongation with the same closing force is exactly the same and parallelism of the fixed plates 3 and 5 is ensured. This can be achieved for example by making the straight lower tie rods 21 tubular and corresponding dimensioning of its wall thickness.

Figure 4:
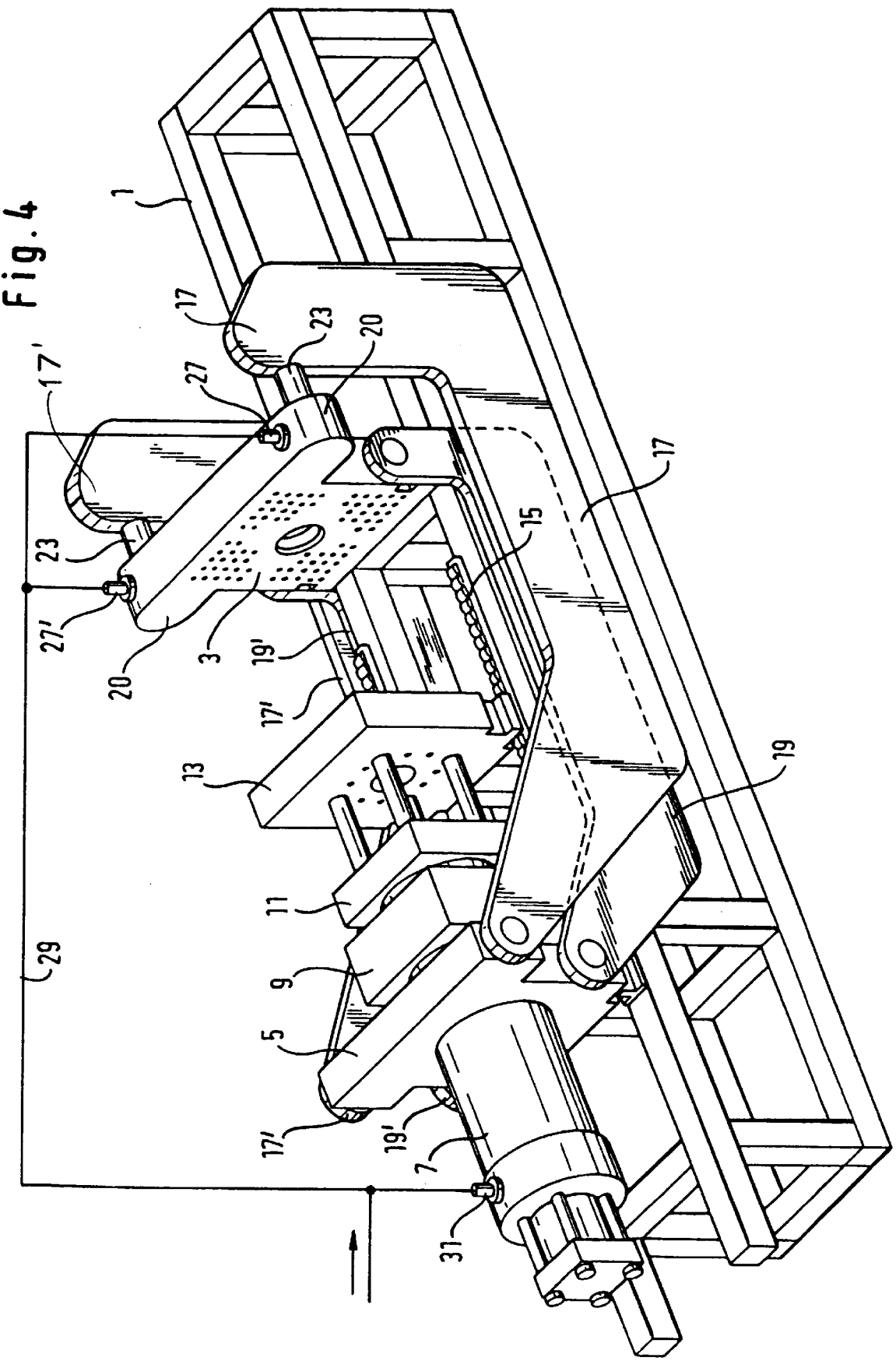
FIG. 4 is an embodiment of the second solution according to the invention in a view similar to that of FIG. 1.

The apparatus shown in FIG. 4 is generally the same as the apparatus shown in FIG. 1 and equivalent parts are assigned the same reference numerals and are not described further here.

In contrast to the apparatus according to FIG. 1 in the apparatus according to FIG. 4 the four tension members 17, 17', 19, and 19' have different resistance to deformation. The lower tension members 19 and 19' have a shape different from that of the upper tension members 17 and 17', for example as shown in FIG. 4 a "flatter" C-shape with shorter C-legs.

Figure 5:
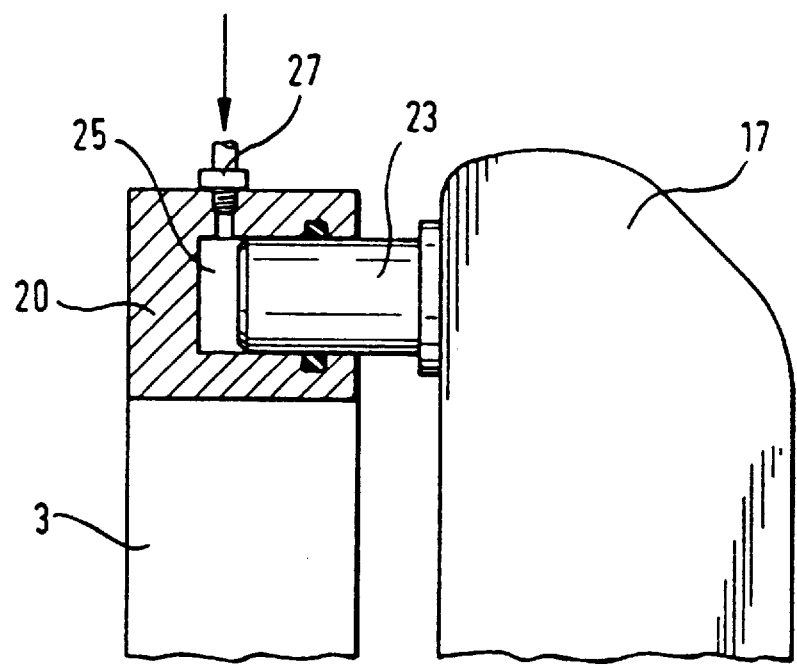
FIG. 5 is a detail of the apparatus shown in FIG. 1 in vertical section.

Since their resistance to deformation longitudinally of the machine is different the closing force or the pressurization force of the injection mold will lead to different elongations of the tension members 17, 17' and 19, 19' and to a loss of parallelism of the stationary plates 3 and 5. In order to avoid this the two upper tension members 17 and 17' are not connected rigidly or via a pivot to the plate 3. Instead the plate is braced via a hydraulic fluid against the tension members 17 and 17'. To this end the plate 3 has two lateral projections 20 behind which engage the vertical legs of the C-shaped-tension members 17 and 17'. Each tension member 17 and 17' is secured in a piston 23 which engages in a cylinder bore 25 which is formed in the respective lateral projection 20 of the plate 3. A sectional detail of this arrangement is shown in FIG. 5. The pistons 23 engages in the closed cylinder bores 25 which is formed in the lateral projections 20 of the plate 3. Each cylinder bore 25 has a pressurized-fluid connection 27 which as shown schematically in FIG. 2 is connected via hydraulic lines 29 to the high-pressure supply connection 31 of the closing cylinder 7. The cross-sectional surface area of the piston 23 is such that it is equal to ¼ of the effective cross-sectional surface area of the piston in the closing cylinder 7. Thus the force transmitted by the piston 23 between the plate 3 and the tension member 17 is always equal to ¼ of the closing force. This ensures that, independent of the different length changes of the tension members 17, 19 or 17', 19', which are inherent from the different shapes and dimensions of these tension members, the parallelism of the plates 3 and 5 is always exactly ensured.

The described bracing via a hydraulic cylinder can be done with the lower tension members 19 and 19' instead of with the upper tension members 17 and 17' or with all four tension members. This hydraulic bracing can also be used with the stationary mold-holding plate 3 instead of with the stationary mold-holding plate 5.

Figure 6:
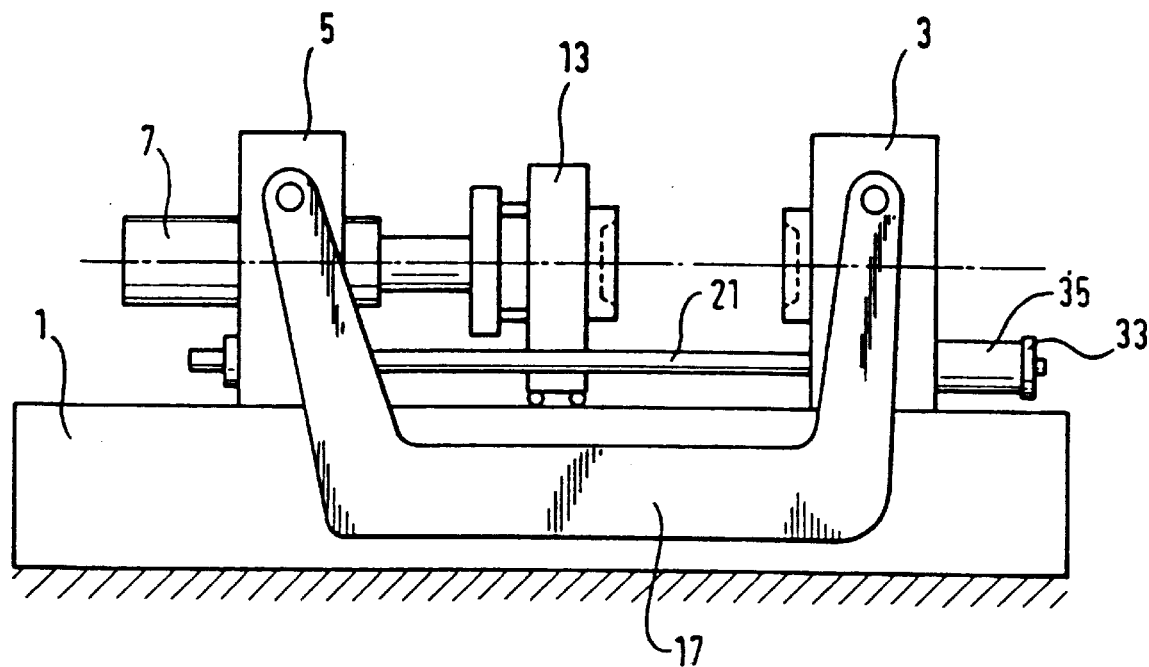
FIG. 6 in another embodiment of the second solution according to the invention in a schematic side view.

In the embodiment according to FIG. 6 as in FIG. 2 each tension member 17 away from the frame is generally C-shaped. This ensures unimpeded access to the space between the stationary mold-holding plate 3 and the movable mold-holding plate 13. The lower tension members 21 closer to the frame are formed as is conventional as straight tie rods. Since these are very close to the machine frame 1 they do not impede access to the space between the fixed plate 3 and the movable plate 13.

The C-shaped tension members can deform more readily longitudinally than the straight tie rods 29. An attempt to impart such stiff construction to the C-shaped tension members 17 so that they have the same elongation with a predetermined closing force as the straight tie rods would lead to a very heavy and bulky shape of the C-shaped tension members 17.

Figure 7:
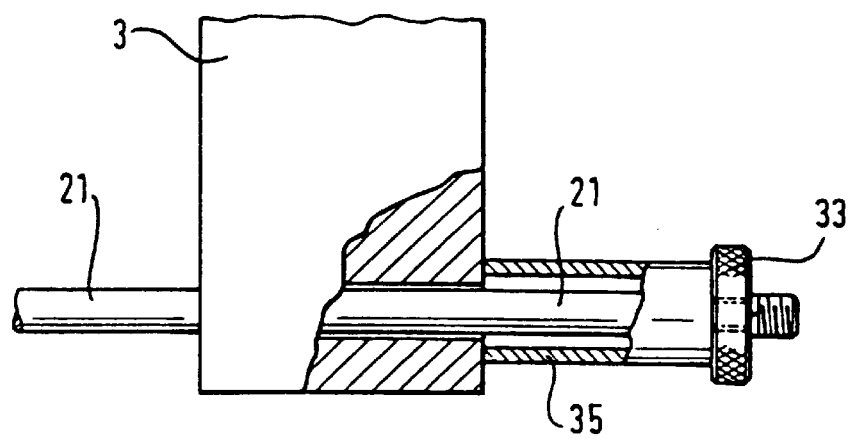
FIG. 7 is a detail of the apparatus according to FIG. 6 in schematic side view.

According to the invention one resorts to the idea of not increasing the resistance to deformation of the C-shaped tension members 17 but to decrease the effective stiffness of the straight tie rods 21. To this end as shown in FIG. 7 the connection between each tie rod 21 and at least one of the fixed plates 3 or 5 is constructed such that the tie rod 21 engages through the stationary plate (here the mold-holding plate 3) and at its end has an enlarged part 33, e.g. a screwed-on nut and that a pressure sleeve 35 is braced between the enlargement 33 and the back side of the mold-holding plate 3. When the closing force is effective between the fixed plates 3 and 5 by the closing cylinder 7 which acts on the tension members 17 and 21 with a corresponding tension each pressure sleeve 35 is acted on by a compressive force so that the pressure sleeve is compressed. Each pressure sleeve 35 is dimensioned with respect to its length, cross section, and material so that its compressive deformation is equal to the difference between the longitudinal deformation caused by the closing force in the C-shaped tension members 17 and the straight tie rods 21. In other words the greater elongation of the tension members 17 resulting from their C-shape is compensated for by the elastic compressive deformation of the sleeves 21. As a result the C-shaped tension members 17 and the straight tension members 21 with the pressure-deforming sleeves 35 always maintain the exact same amount of movement apart at the four corners of the fixed plates 3 and 5 so that the fixed plates 3 and 5 in spite of the different shape and resistance to deformation of the tension members 17 and 29 always remain exactly parallel.

Constructing the pressure sleeves so that they produce the needed amount of compressive deformation is well within the scope of the person skilled in the art. In case the C-shaped tension members 17 are very weakly dimensioned so that they have considerable longitudinal deformation the pressure sleeves 35 can in certain circumstances be replaced by or used along with spring elements of the spring-washer or other type.

The invention is not limited to the details of the described embodiments. Numerous changes and constructions of the described embodiments are possible for the person skilled in the art within the scope of the invention. Thus it is for example possible with the first solution according to the invention where the upper and lower tension members must have the same resistance to longitudinal deformation also possible to give the lower tension members 19 a C-shape with shorter C-legs than the upper tension members 17, as shown in FIG. 4 and by weaker dimensioning of the lower tension members by forming cutouts or other means so that the resistance to deformation of the lower tension members 19 is reduced and made the same as that of the upper C-shaped tension members 17.

Preferably with all embodiments the attachment points of the upper and lower tension members 17, 19 and 21 are at the same spacing above and below a horizontal plane including the closing-force axis 10. In this case the closing force is distributed uniformly between the upper and lower tension members so that same, in order to be identically elongated under the effect of the closing force, have the same resistance to deformation. It is also possible to locate the attachment points of the tension members on the fixed plates at different spacings from the horizontal plane including the closing-force axis 10. In this case those tension members whose attachment points are closer to the horizontal plane including the closing-force axis have a larger portion of the closing force. Such an unequal distribution of the closing force to the tension members must be accounted for with the amount of resistance to deformation of the tension members or of the force-transmitting elements connecting the tension members with the fixed plates.

The closing drive can also be constituted in a manner different form a hydraulic cylinder, e.g. as known with a knee-lever system or with an electrically driven threaded spindle.

We claim:

1. A mold-closing apparatus for a plastic-molding machine with
    a machine frame,
    a first fixed plate and a second fixed plate supported on the frame and spaced apart parallel to each other,
    at least one movable mold-holding plate which is movable between the first and second fixed plates on the frame,
    at least one closing drive mounted on said first fixed plate and which can act on and displace the movable mold-holding plate with a closing force effective along a force axis toward the fixed plate, and
    a plurality of tension members which connect the two fixed plates with each other and which withstand reaction forces created by the closing drive on the first and second fixed plates, the tension members including two upper tension members whose attachment points with the first and second fixed plates above a horizontal plane including the force axis and two lower tension members whose attachments points on the fixed plates lie below said horizontal plane, the upper tension members being C-shaped such that at least in a region between the mold-holding plate and the second fixed plate, upper edges of the upper tension members lie below the horizontal plane including the closing-force axis so as to leave substantially unimpeded access to a space between the mold-holding plate and the second plate, the lower tension members so constructed and dimensioned that their resistance to deformation in a direction of the closing force is equal to that of the upper tension members so that with a given closing force the elongation of the lower tension members is equal to the elongation of the upper tension members.

2. The apparatus according to claim 1 wherein the lower tension members have the same C-shape and dimensions as the upper tension members.

3. The apparatus according to claim 1 wherein the lower tension members are formed as straight tie rods.

4. The apparatus according to claim 3 wherein the lower tension members are tubular.

5. The apparatus according to claim 1 wherein the attachment points of the upper tension members on the first and second fixed plates is closer to the horizontal plane including the force axis than the attachment points of the lower tension members first and second on the fixed plates.

6. The apparatus according to claim 1 wherein at least the upper tension members are pivotally connected with first and second the fixed plates.

* * * * *